(12) United States Patent
Wings et al.

(10) Patent No.: US 12,091,568 B2
(45) Date of Patent: Sep. 17, 2024

(54) COMPOSITION FOR A LOW SHRINKAGE PASTY FILL AND FINISHING MATERIAL, PASTY FILL AND FINISHING MATERIAL, AND METHOD FOR PRODUCING A PASTY FILL AND FINISHING MATERIAL

(71) Applicant: KNAUF GIPS KG, Iphofen (DE)

(72) Inventors: Norbert Wings, Wendelsheim (DE); Claudia Van Sloun, Korschenbroich (DE); Elena Heinrich, Neuss (DE); Sebastian Mischke, Meerbusch (DE)

(73) Assignee: KNAUF GIPS KG, Iphofen (DE)

( * ) Notice: Subject to any disclaimer, the term of this patent is extended or adjusted under 35 U.S.C. 154(b) by 673 days.

(21) Appl. No.: 17/289,856

(22) PCT Filed: Nov. 6, 2018

(86) PCT No.: PCT/EP2018/000501
§ 371 (c)(1),
(2) Date: Apr. 29, 2021

(87) PCT Pub. No.: WO2020/094207
PCT Pub. Date: May 14, 2020

(65) Prior Publication Data
US 2021/0403744 A1    Dec. 30, 2021

(51) Int. Cl.
*C09D 123/08* (2006.01)
*C09D 5/00* (2006.01)
(Continued)

(52) U.S. Cl.
CPC ......... *C09D 123/0853* (2013.01); *C09D 5/00* (2013.01); *C09D 7/61* (2018.01);
(Continued)

(58) Field of Classification Search
CPC ...... C09D 123/0853; C09D 5/00; C09D 7/61; C09D 7/65; C09D 7/70; C09D 131/04;
(Continued)

(56) References Cited

U.S. PATENT DOCUMENTS

| 7,955,658 B2 | 6/2011 | Grasse et al. |
| 2007/0232736 A1 | 10/2007 | Liling |
| 2015/0176267 A1* | 6/2015 | Casimiro ............... C09D 5/34 |
| | | 428/313.5 |

FOREIGN PATENT DOCUMENTS

| EP | 2886523 A1 | 6/2015 |
| GB | 2112788 A | 7/1983 |

(Continued)

OTHER PUBLICATIONS https://onlinelibrary.wiley.com/doi/pdf/10.1002/ceat.200900173 Thomas et al. ( Improvement of Flowability of Fine cohesive powders by flow additives, Chem. Eng. Technol. 2009, 32, No. 10), p. 1472 (Year: 2009).*

(Continued)

*Primary Examiner* — Ling Siu Choi
*Assistant Examiner* — Olga Lucia Donahue
(74) *Attorney, Agent, or Firm* — Christensen, Fonder, Dardi PLLC; Diane E. Bennett; Peter S. Dardi

(57) ABSTRACT

The invention relates to a composition for a pasty fill and finishing material, a pasty fill and finishing material, and a method for producing a pasty fill and finishing material. The composition comprises at least one filler, at least one binding agent, and additives, wherein the at least one filler has a density dependent flowability ($ff_\rho$) value of from 3 to 20.

20 Claims, 1 Drawing Sheet

(51) Int. Cl.
  *C09D 7/40* (2018.01)
  *C09D 7/61* (2018.01)
  *C09D 7/65* (2018.01)
  *C09D 131/04* (2006.01)
(52) U.S. Cl.
  CPC ............... *C09D 7/65* (2018.01); *C09D 7/70* (2018.01); *C09D 131/04* (2013.01)
(58) Field of Classification Search
  CPC ............ C09D 5/34; Y02W 30/91; C04B 2111/00482; C04B 2111/00681; C04B 26/04; C04B 14/18; C04B 18/082; C04B 26/06; C04B 14/042; C04B 14/102; C04B 14/104; C04B 14/106; C04B 14/20; C04B 14/26; C04B 14/28; C04B 20/0032; C04B 20/0008; C04B 20/1051; C04B 24/023; C04B 24/026; C04B 24/12; C04B 24/383; C04B 2103/67; C04B 24/08
  See application file for complete search history.

(56) References Cited

FOREIGN PATENT DOCUMENTS

| | | |
|---|---|---|
| JP | H08-183678 A | 7/1996 |
| JP | 2009-515014 A | 4/2009 |
| WO | 2007-131618 A1 | 11/2007 |
| WO | 2017-108145 A1 | 6/2017 |

OTHER PUBLICATIONS

"Fillite-Product Information", CFS Fiberglass, http://www.cfsnet.co.uk.acatalog/Fillite_TDS.pdf, p. 1, (May 14, 1996).

International Search Report for co-pending European Patent Application No. PCT/EP2018/000501 dated Jul. 3, 2019.

Office Action from corresponding Japanese Patent Application No. 2021-524257 dated Oct. 18, 2022.

* cited by examiner

COMPOSITION FOR A LOW SHRINKAGE PASTY FILL AND FINISHING MATERIAL, PASTY FILL AND FINISHING MATERIAL, AND METHOD FOR PRODUCING A PASTY FILL AND FINISHING MATERIAL

CROSS REFERENCE TO RELATED APPLICATIONS

This application is a National Stage filing of PCT Application No. PCT/EP2018/000501 filed Nov. 6, 2018, entitled "Composition For A Low Shrinkage Pasty Fill And Finishing Material, Pasty Fill And Finishing Material, And Method For Producing A Pasty Fill And Finishing Material", which is incorporated herein by reference.

The invention relates to a composition for a pasty fill and finishing material, a pasty fill and finishing material, and a method for producing a pasty fill and finishing material according to the respective independent claims.

In prior art, basically two types of filling materials are known for filling joints or for being applied to surfaces, such as walls, in order to smooth out unevenness and to additionally function as primer layer for another layer to be applied thereon. Namely, on one hand, there are powdery filling materials, and on the other hand, there are pasty filling materials. Pasty filling materials have the advantage that they are ready to use, whereas powdery filling materials have to be mixed with water before use. Pasty filling materials have to be storable over months without their processing characteristics being modified or deteriorated.

The pasty filling materials known in the state of the art (e.g. US 2005/0235878 A1) are physically drying systems comprising polymer binders, fillers and additives.

A polymer binder, for example, polyvinyl acetate, polyethylene vinyl acetate, polyacrylate, and/or polyvinyl alcohol is employed, either as aqueous dispersion or as re-dispersible powder. The binders have the function to bind the components of the filler material and to adhesively bond the filler to the substrate, like a wall or similar.

Filler components, nodular and lamellar materials that are usually of mineral origin are used. The filler components form the framework or skeleton of the coating and, thus, contribute to the layer thickness and sink characteristics depending on the amount of filler material added. A main mineral filler material is natural calcium carbonate or calcium magnesium carbonate (dolomite).

As additives, e.g. thickening agents and biocides may be used. Thickening agents may be cellulose-based additives, such as hydroxypropyl methyl celluloses and hydroxyethyl celluloses, which have the effect that the viscosity of the pasty filling material is maintained constant, and which ensure a constant processability when stored over a time period of up to one year.

Biocides are added in order to prevent bacterial contamination, and finally, fungicides are added for preventing fungal infection.

Pasty filling materials are meanwhile more and more used for semi-finishing surfaces, thus thereinafter named as pasty fill and finishing materials. Semi-finishing means in this context, that no further coating on the surface is required. However, subsequent coatings (e.g. decorative coatings) are possible. The majority of pasty fill and finishing materials are applied manually, for example, by means of a trowel. If needed, the person using the fill and finishing material adds water for facilitating and improving the processability.

With increasing mechanization the application of chemical building products, pasty fill and finishing materials that can be used in processing machines have been developed. Specifically, sprayable fill and finishing materials have been developed which can be applied to a surface with a layer thickness of up to 3 mm and which act as a substrate for further, subsequently applied layers as for example wall paint or wall papers.

However, sprayable fill and finishing materials on a mineral basis known from prior art have the following shortcomings: When applying the pasty fill and finishing material by spraying, usually the method of hydraulic atomization or "airless application method" is employed. A key requirement for the airless application is that the homogeneous pasty fill and finishing material requires a reduced shear stress once it is being moved through the spraying equipment and the spray nozzle during spraying. Therefore, pasty sprayable fill and finishing materials have to be thoroughly prepared by mechanical homogenization prior to being applied to a surface or joint, which effects a shear thinning. This additional procedure leads to a substantial increase of the total processing time.

Furthermore in pasty sprayable fill and finishing materials known from prior art as well as in plaster materials usually organic components are implemented in order to ensure their mechanical workability. The use of organic components, however, usually involves emissions and odor nuisance, which restricts the use of such products with respect indoor application. Moreover, organic components are critical with respect to fire protection.

Pasty sprayable fill and finishing materials are used to level unevenness of a surface to provide a homogeneous surface for further coatings, for example, decorative coatings. Many pasty fillers which are extremely well suited for being used in mechanical spraying devices, are either not able to provide this compensating function such that additional processing steps are necessary, or entail the above mentioned disadvantages with respect to odor and emissions, or poor fire behavior.

As described in U.S. Pat. No. 6,545,066 in particular lightweight pasty fill and finishing materials contain spherical silicate products, like micro perlite, for reducing the specific weight of the final product and provide an increased surface area yield of the product. Lightweight pasty fill and finishing materials tend to (post-) thicken for several days to weeks after production and to the generation of air bubbles during storage. The generation of air bubbles and the thickening causes problems during the machine application, in particular with the "airless application method".

Further, in cases where pasty fill and finishing materials are used as substrate layers for subsequent decorative coatings, products having a very high brightness and a high drying capacity have to be employed.

Finally, in cases where pasty fill and finishing materials are applied on porous or mineral substrates with cavities (e.g. ready-mixed concrete) they show increasingly bubble formation on the surface. This is a huge drawback, since it is very often the case that the substrates are porous or mineral substrates with cavities. When applied with the method of hydraulic atomization ("airless application method") the pasty fill and finishing material is pressed at pressures up to 220 bar through a nozzle of about 1 mm diameter. The atomized spray of the pasty sprayable fill and finishing material compresses the air after leaving the nozzle and reaches the surface under pressure. In concrete, for example, the compressed air, which is pushed forward, is pressed into the cavities (or chip marks) of the concrete and the pasty filler material lays on top of the cavities, without filling them. After the coating, the compressed air from inside the cavities presses against the coating so that bubble formation occurs. This usually happens within the first 10 to 30 min after the application.

Therefore, it is an objective of the present invention, to provide a composition for a pasty fill and finishing material, which can be easily machine-processed, provides good crack and shrinkage resistance, shows only a low tendency of thickening during material storage and especially avoids bubble formation on the coated surface as explained above. It is also an objective of the present invention to provide a corresponding pasty fill and finishing material, and a method for producing such a pasty fill and finishing material.

This objective is solved by a composition of a pasty fill and finishing material, comprising at least one filler, at least one binding agent, and additives, wherein the at least one filler has a density dependent flowability ($ff_\rho$) value of from 3 to 20, preferably of from 4 to 15, more preferably of from 5 to 10, most preferably of from 6 to 8. Preferred embodiments of the invention are defined in the respective dependent claims.

The inventive composition provides pasty fill and finishing materials, which allow using the method of hydraulic atomization ("airless application method") without the formation of bubbles on the surface after coating. Therefore, it is possible to produce a surface coated with the inventive pasty filler material without any bubble formation.

Further, the inventive composition provides pasty fill and finishing materials, which can be used without any additional processing or preceding preparation steps, in particular in airless spraying applications. Such a pasty fill and finishing material can be easy manually processed and can provide good crack and shrinkage resistance. Additionally, if it uses an additive consisting of a blend of liquid hydrocarbons, modified fatty acid derivatives, nonionic emulsifiers, and silicone oil an excellent workability of the filler over a long time can be ensured. The aliphatic hydrocarbon components of this additive have an anti-foaming/venting effect. Thereby, air bubbles generated during storage of the filler material can be removed.

Further, the amphiphilic coating of the perlites can reduce the water demand of the highly porous perlites and thus, can minimize post-thickening while keeping the rheological properties of the pasty fill and finishing material constant. The hydrophobic part of the coating can interact with the aliphatic constituents of the pasty fill and finishing material and can reduce the water demand of the porous perlites and therefore the post-thickening. The hydrophilic part of the coating can interact with the polar constituents of the filler and can promote homogeneity of the material; i.e. can prevent separation of the individual constituents during storage.

According to a preferred embodiment of the invention, the at least one filler is a hollow, spherical aluminum silicate.

The expression "spherical" in the context of the present invention has the meaning of a very round shape, like e.g. a billiard ball. However, even round shapes with little unevenness are considered spherical in the context of the present invention.

The expression "hollow" in the context of the present invention has the meaning of empty, wherein empty does not encompass gas. In other words, the hollow, spherical aluminum silicate is hollow do not have any liquids or solids in their internal space, but gas. This gas may be e.g. carbon dioxide ($CO_2$) or nitrogen ($N_2$) or any mixture thereof, e.g. 70% of $CO_2$ and 30% of $N_2$. Other gases, preferably inert gases, are possible, too.

Further, the hollow, spherical aluminum silicate may be characterized by being lightweight (e.g. with an average particle density of about from 780-950 kg/m$^3$ and an average bulk density of about from 400-490 kg/m$^3$), being free-flowing, spherical and inert.

A preferred composition may comprise 1.0 to 10.0% by weight of the total composition, preferably 1.5 to 8.5% by weight of the total composition, more preferably 2.0 to 7.0% by weight of the total composition of the hollow, spherical aluminum silicate and/or the hollow, spherical aluminum silicate may comprise aluminium oxide of from 5 to 35% by weight of the hollow, spherical aluminum silicate and/or silicon dioxide of from 50 to 80% by weight of the hollow, spherical aluminum silicate.

The density dependent flowability ($ff_\rho$) describes the ability of a bulk material to flow out of a silo by gravity. In a more physical way, the density dependent flowability ($ff_\rho$) can then be described as the product of the bulk density ($\rho_b$) and the flowability ($ff_c$) (divided by 1000 kg/m$^3$ to receive term without dimension), wherein the flowability ($ff_c$) is the ratio of the consolidation stress ($\sigma_1$) divided by the compressive strength ($\sigma_c$). The consolidation stress ($\sigma_1$) and the compressive strength ($\sigma_c$) can be determined with a compression test: first, the bulk solid is filled for example in a hollow cylinder and is loaded in the vertical direction (the consolidation stress $\sigma_1$). After consolidation, the bulk solid is relieved of the consolidation stress, $\sigma_1$, and the hollow cylinder is removed. In the second step the consolidated cylindrical bulk solid is loaded with an increasing vertical compressive stress until the bulk solid form will break at a certain stress (the compressive strength ($\sigma_c$)). However, other methods for determining the density dependent flowability ($ff_\rho$) are known in the state of the art for example with a ring shear tester. For example, the value of the density dependent flowability ($ff_\rho$) for a hollow, spherical aluminum silicate as described above results in about 7.0, thus it is significantly higher than the respective value for dolomite powder and perlite resulting in about 2.6.

Thus, the flow behavior of the hollow, spherical aluminum silicate as described above leads to a significant reduction of the shear stress once the homogeneous pasty material in the airless application is being moved through the spraying equipment and spray nozzle during spraying.

In another preferred embodiment of the invention the composition further comprises at least a second and a third filler, wherein the second and the third filler of the composition may comprise at least a first and a second carbonate, wherein the particle size distribution of the first carbonate is different from the particle size distribution of the second carbonate and/or wherein the first and the second carbonate are selected from a group consisting of calcium carbonate, calcium magnesium carbonate or any mixture thereof. However, the numbering (first, second, third and so on) can be changed. Further, it has to be noted that the features of the D50 and D98 values of the first and second carbonate are independent from their chemical constitution, which means that, for example, calcium carbonate or calcium magnesium carbonate or any mixture thereof can be provided with any of the values as defined for the D50 and D98 values.

Further, in a preferred embodiment the first carbonate filler may be dolomite powder (commercially available from Omya GmbH Cologne as "Dolomitmehl 90") in an amount of from 30 to 60% by weight of the total composition, preferably 30 to 45% by weight of the total composition, and/or the second carbonate filler may be Juraperle MM (commercially available by Eduard Merkle GmbH & Co.

KG) in an amount of from 5 to 25% by weight of the total composition, preferably of from 10 to 20% by weight of the total composition.

Preferably, the composition may comprise 35 to 85% by weight of the total composition of the first and the second carbonate filler (which means the weight of the first and the second carbonate added up). Especially preferred is an amount of 40 to 65% by weight of the total composition.

In a preferred embodiment of the invention, the particle size distribution of the hollow, spherical aluminum silicate and the first and a second carbonate may have specific values: the D98 value for the first carbonate may be of from 70 to 120 μm, preferably of from 80 to 100 μm, and/or the D98 value for the second carbonate may be of from 120 to 200 μm, preferably of from 150 to 170 μm. Further, the first and/or the second carbonate may have a D50 value of from 10 to 30 μm, preferably of from 15 to 25 μm. Moreover, the hollow, spherical aluminum silicate may have a D50 value of from 90 to 200 μm, preferably of 100 to 180 μm and/or a D98 value of from 150 to 400 μm, preferably of from 170 to 250 μm.

D50 and D98 values to describe the particle size distribution of (bulk) materials are known for the person skilled in the art.

According to the present invention, the composition may comprise at least one binding agent. The at least one binding agent may be selected from the group consisting of poly-ethylene-vinyl acetate), polyvinyl acetate, polyacrylate, polyvinyl alcohol (PVOH) or any combinations thereof, preferably poly(ethylene-vinyl acetate), polyvinyl alcohol (PVOH) or any combinations thereof.

The at least one binding agent may be added to the composition as aqueous dispersion or as re-dispersible powder. Preferably, the at least one binding agent may be contained in the composition in amounts of from 0.1 to 20.0% by weight of the total composition, preferably 1 to 15.0% by weight of the total composition, more preferably 1.5 to 10.0% by weight, most preferably 2 to 5% by weight of the total composition of the total composition.

A preferred composition according to the present invention further may comprise a fourth filler, wherein the a fourth filler is selected from a group consisting of sepiolite, attapulgite, talc, vermiculite, montmorillonite, illite, kaolinite or hectorite, preferably attapulgite or sepiolite, and/or wherein the composition comprises 0.1 to 10.0% by weight of the total composition, preferably 0.1 to 5.0% by weight of the total composition, more preferably 0.1 to 2.0% by weight of the total composition of a fourth filler.

Another preferred composition according to the present invention may further comprise cellulose, preferably modified cellulose, more preferably modified cellulose selected from the group consisting of 2-hydroxyethyl methyl cellulose, hydroxypropyl cellulose, ethylcellulose, methylcellulose, methyl ethyl cellulose, carboxymethyl cellulose, hydroxyethyl cellulose and hydroxylpropyl methyl cellulose, or any combinations thereof, most preferably hydroxyl ethyl cellulose, hydroxylpropyl methyl cellulose, or any combinations thereof. Moreover, the composition preferably may comprise 0.1 to 1.2% by weight of the total composition of modified cellulose consisting of hydroxypropyl methyl cellulose and/or hydroxyethyl cellulose.

Further, the inventive composition may comprise at least a fifth filler, wherein this fifth filler is selected from the group consisting of calcium sulfate dihydrate, calcium carbonate, calcium magnesium carbonate and perlite, preferably perlite, and/or wherein the composition may comprise of from 1.0% to 40% by weight of the total composition, preferably 1.0% to 20% by weight of the total composition, more preferably 1.0% to 10% by weight of the total composition, most preferably 2.0% to 5.0% by weight of the total composition of at least a fifth filler.

Further, the perlite mentioned above may be micronized and expanded perlite with a particle size D98 of less than 200 μm, preferably lower than 100 μm. The mean particle size is determined by averaging linear intercepts of the grain boundaries. Especially, the mean particle size D50 is between 20 to 80 μm, preferably between 40 to 60 μm. Moreover, the perlite mentioned above may have an amphiphilic coating. The perlite may help to reduce the weight for providing a pasty filler material.

Especially preferred the composition comprises 2.0 to 5.0% by weight of the micronized and expanded perlites.

The amphiphilic coating of the perlites comprises preferably alkoxy-modified alkylsilicone resins, especially aminoalky-substituted polydimethylsiloxanes of the formula $(C_2H_6OSi)_n$, wherein n is preferably from 30 to 300.

The alkoxy-modified alkylsilicone resins of the amphiphilic coating improve the flow characteristics of the sprayable filler material. This allows a reduced shear stress for implementing a continuous material transport, for example, an airless method without a mechanical homogenizing of the material before the application. Once the material is on the surface the shear stress increased again, which allows achieving a comparably high application thickness.

A preferred composition according to the present invention further may comprise of from 0.1 to 1.0% by weight of the total composition, preferably 0.1 to 0.4% by weight of the total composition, of an additive consisting of a blend of alkoxylated nonionic compounds, nonionic fatty compounds and hydrophobic silica.

All amounts given in this document refer to the pasty consistence of the filler material, i.e. including the amount of water, except indicated otherwise.

Preferably, the alkoxylated nonionic compounds may be selected from the group consisting of alkoxylated polyols, alkoxylated alcohols, alkoxylated alkylphenols, alkoxylated alkylamides, alkoxylated acetylenic glycols, alkoxylated polybasic acids, alkoxylated alkylene oxides, alkoxylated organo silicones and polymers thereof.

Preferably, the nonionic fatty compounds may be selected from the group consisting of fatty acid esters, fatty alcohols, fatty alkoxylates, fatty polyglycol-ethers, fatty acids, and mixtures thereof. More preferred, the fatty compounds may be fatty acids.

According to yet a further preferred embodiment of the invention, the composition further may comprise biocides as additives. The biocides added to the composition may be on a basis of 2-methyl-1,2H-thiazol-3(2H)-one (MIT) and/or 1,2-benzisothiazol-3(2H)-one (BIT). The composition preferably may comprise 0.1 to 2% by weight, preferably 0.1 to 0.4% by weight of biocides.

The pasty fill and finishing material preferably may comprise water in amounts from 20 to 60% by weight, preferably 30 to 50% by weight of the total composition.

According to the present invention, also a pasty fill and finishing material, in particular physically drying sprayable fill and finishing material, which is made from the above-specified composition is provided. The inventive pasty fill and finishing material provides the advantages already described above in connection with its composition.

Preferably, the specific weight of the pasty fill and finishing material is below 1.6 kg/l. In particular preferred it is below 1.5 kg/l. This pasty fill and finishing material is considered as mid-weight pasty fill and finishing material.

According to a further preferred embodiment of the present invention, a layer thickness of 1 to 3 mm immediately after application will shrink only to layer thicknesses of 80% up to 90%, preferably 83% up to 87% after drying. From prior art it is known that a layer thickness of 1 to 3 mm a composition of the state of the art shrinks to a layer thickness of roughly 65% after drying. Thus, the present invention shows a significant reduction in shrinking of the dried composition layer.

The present invention also provides a method for producing pasty fill and finishing material, in particular also midweight pasty fill and finishing material as specified above. The method is based on a two-stage process, according to which in a first step, dry components are homogenized, and in a second step, the homogenized dry components are added to aqueous or water-dilutable components. The dry components comprise fillers, perlites, and optionally other dry additives and/or dry binding agents. The perlites may have an amphiphilic coating.

The aqueous or water-dilutable components can comprise an additive consisting of a blend of liquid hydrocarbons, modified fatty acid derivatives, nonionic emulsifiers, and silicone oil, and optionally other liquid additives and/or liquid binding agents. By the inventive method, pasty fill and finishing materials having the above-described advantages can be provided.

Preferably, the first and second steps of the two-stage process may be carried out in parallel for more than 80% of the processing time. Thus, the parallel processing saves processing time, and thus renders the method more economical.

The resulting pasty fill and finishing material generally can be applied by all methods known from the state of the art, e.g. by aid of mechanic tools or by machine processing. The machine processing is preferred.

Further details and features of the invention are shown in the following examples which are just for clarification and do not restrict by any means the scope of the protection conferred by the claims.

Table 1 shows a comparison of a state of the art sample and an embodiment of the invention, which differs from the state of the art at least in using two carbonates, which differ in their particle size distribution and hollow, spherical aluminum silicate. In this table the D98 value of the first carbonate (dolomite powder) is 90 μm and the D50 value is 20 μm. The D98 value of the second carbonate (Juraperle MM) is 160 μm and the D50 value is 20 μm. The D98 value of the hollow, spherical aluminum silicate (Filite 160, commercially available from Tolsa SA, Madrid, Spain) is 180 μm and the D50 value is 106 μm.

TABLE 1

| Raw Material | Raw Material Chemical Description | Example according to the invention % by weight | Example ranges from prior art regular weight % by weight | Example ranges from prior art lightweight % by weight |
| --- | --- | --- | --- | --- |
| Dolomite powder 90 μm | carbonate | 40-45 | 60-65 | 40-50 |
| Juraperle MM | carbonate | 13-18 | — | — |
| Minugel FG | palygorskite | 1-2.0 | 1-2.0 | 2-3.0 |
| Volite 200 H | micronised expanded perlites; surface treatment (0.5%): silicone microemulsion (amino-alkyl-functional polydimethylsiloxane) | 2.0-5.0 | — | 2.0-5.0 |
| Filite 160 | hollow, spherical aluminum silicate | 2.0-4.0 | — | — |
| Cellosize QP 52000 | hydroxyethyl cellulose (HEC) | 0.1-0.3 | 0.1-0.3 | 0.1-0.3 |
| Walocel MK 25000 PFV | hydroxypropyl methylcellulose (HPMC) | 0.01-0.4 | 0.01-0.4 | 0.01-0.4 |
| Selvol E205 S | polyvinyl alcohol (PVOH) | 0-0.5 | 0.1-0.5 | 0-0.5 |
| Agitan 351 | blend of alkoxylated nonionic compounds, nonionic fatty compounds and hydrophobic silica | 0.1-0.2 | 0-0.2 | 0.1-0.2 |
| Vinamul 3171 | ethylene-vinyl acetate copolymere (EVA) | 1.0-5.0 | 1.0-5.0 | 1.0-5.0 |
| Biocides | 2-methyl-1,2-H-thiazol-3(2H)-one (MIT) and/or 2-bromo-2-nitropropane-1,3-diol (BNPD) | 0.1-0.4 | 0.1-0.4 | 0.1-0.4 |
| Water | water | 30-35 | 30-35 | 30-50 |
| Total Batch | | 100 | 100 | 100 |

A pasty sprayable fill and finishing material having a composition according to the present invention provides for a homogeneous substance, which still has comparably low shear stress at high shear rates. This enables a continuous material flow for an efficient spray application performance. The spherical form of the hollow, spherical aluminum silicate causes—compared to other hollow silicates—better intrusion into the defects of the surface to be coated. This can be seen especially on concrete surfaces made from site concrete or sophisticated concrete with surface defects, where capillary forces are active and thus a lower surface tension is needed (see figures). Further, the combination of the first and the second carbonate that differ in their particle size distribution has the effect that the thickness reached in the wet state only caves in very little when drying.

The compilation of the particle size distributions of the first and second carbonate as well as of the hollow, spherical aluminum silicate surprisingly show a lower tendency of agglomeration, so that less post-thickening occurs and the processing properties are ensured for a longer time.

BRIEF DESCRIPTION OF THE DRAWINGS

FIG. 1 shows a state of the art pasty fill and finishing materials brought up on a concrete surface with bubble formation and FIG. 2 shows an inventive pasty fill and finishing material brought up on a concrete surface without bubble formation.

For all three FIGS. 1A, 1B and 2 pasty fill and finishing material is sprayed on concrete with defects (concrete elements commercially available for example from Bosch Beton GmbH & Co. KG) using the "airless application method" described before. FIG. 1A represents a regular weight example according to table 1 and FIG. 1B represents a lightweight example according to table 1. In FIG. 2 an inventive pasty fill and finishing material according to table 1 has been used. In FIGS. 1A-1B the pasty fill and finishing materials covers the defects without filling them. Therefore, bubble formation occurs from compressed air, as explained above. In FIG. 2 with the inventive pasty fill and finishing material, the defects were filled and thus no bubble formation is visible. The pictures of the three coated surfaces have been taken after 24 hours after application.

Figure 1A:
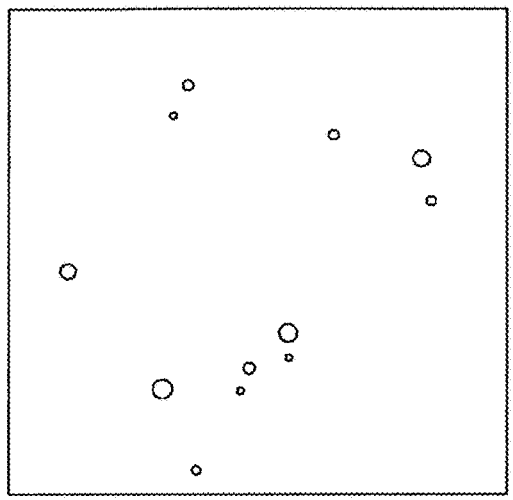
In FIGS. 1A-1B state of the art pasty fill and finishing materials were used.
Figure 1B:
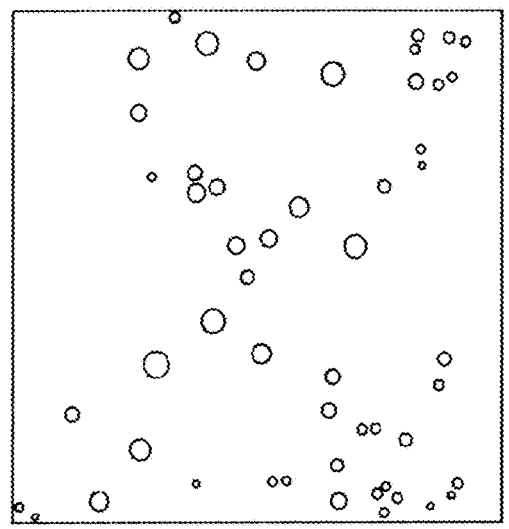
Figure 2:
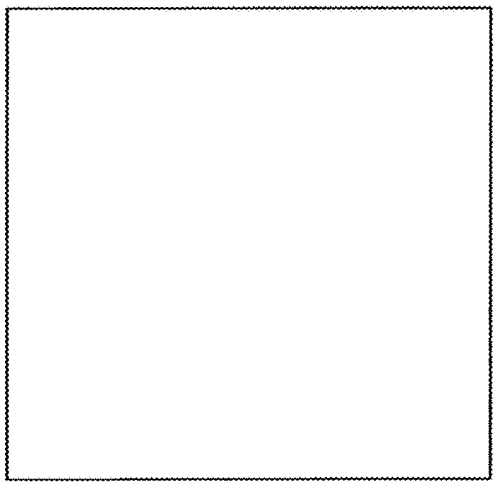

Further, the pasty sprayable fill and finishing material having a composition according to an embodiment of the present invention further provides at a layer thickness of 1 to 3 mm a homogeneous surface for optionally following decorative coatings.

Further, post-thickening, as indicated by the difference in viscosity, is reduced to about ⅓ for the pasty filler according to the invention compared to the pasty fill and finishing material according to the state of the art. Both, the pasty fill and finishing material according to the invention and the pasty filler according to the state of the art, comprise micronized and expanded perlites.

The amphiphilic coating was achieved with a silicone micro-emulsion comprising amino-alkyl functional polydimethylsiloxane.

Stated (measured) values like e.g. a carbonate commercially available stating a D50 value of 20 μm is considered to be about 20 μm, depending on the accuracy of the measurements.

The invention claimed is:

1. A composition for a pasty fill and finishing material, comprising at least one filler, at least one binding agent, and additives, wherein the at least one filler has a density dependent flowability ($ff_\rho$) value of from 3 to 20, wherein the composition further comprises at least a second and a third filler, wherein the second and the third filler of the composition comprise at least a first and a second carbonate, wherein the particle size distribution of the first carbonate is different from the particle size distribution of the second carbonate, wherein the first carbonate has a D98 value of from 70 to 120 μm and the second carbonate has a D98 value of from 140 to 180 μm.

2. The composition according to claim 1, wherein the at least one filler is a hollow, spherical aluminum silicate.

3. The composition according to claim 2, wherein the composition comprises 1.0 to 10.0% by weight of the total composition of the hollow, spherical aluminum silicate and/or
wherein the spherical aluminum silicate comprises aluminum oxide of from 5 to 35% by weight of the hollow, spherical aluminum silicate and/or silicon dioxide of from 50 to 80% by weight of the hollow, spherical aluminum silicate.

4. The composition according to claim 2, wherein the hollow, spherical aluminum silicate has a D50 value of from 90 to 200 μm and/or has a D98 value of from 150 to 400 μm.

5. The composition according to claim 2, wherein the hollow, spherical aluminum silicate has a D50 value of from 100 to 180 μm and/or has a D98 value of from 170 to 250 μm.

6. The composition according to claim 1, wherein the first and the second carbonate are selected from a group consisting of calcium carbonate, calcium magnesium carbonate or any mixture thereof.

7. The composition according to claim 1, wherein the first and/or the second carbonate has/have a D50 value of from 10 to 30 μm.

8. The composition according to claim 1, wherein the at least one binding agent is selected from a group consisting of poly(ethylene-vinyl acetate), polyvinyl acetate, polyacrylate, polyvinyl alcohol or any combinations thereof, and/or
wherein the composition comprises 0.1 to 20.0% by weight of the total composition of the at least one binding agent.

9. The composition according to claim 1, wherein the composition further comprises at least a fourth filler, wherein this fourth filler is selected from the group consisting of sepiolite, attapulgite, talc, vermiculite, montmorillonite, illite, kaolinite or hectorite, and/or
wherein the composition comprises 0.1 to 10.0% by weight of the total composition of a fourth filler.

10. The composition according to claim 1, wherein the composition further comprises cellulose.

11. The composition according to claim 1, wherein the composition further comprises at least a fifth filler, wherein this fifth filler is selected from the group consisting of calcium sulfate dihydrate, calcium carbonate, calcium magnesium carbonate and perlite, and/or
wherein the composition comprises of from 1.0% to 40% by weight of the total composition of at least a fifth filler.

12. The composition according to claim 11, wherein the fifth filler is perlite and the perlite are micronized and expanded perlite with a particle size D98 of less than 200 μm, and/or
wherein the perlites have an amphiphilic coating.

13. The composition according to claim 1, wherein the composition further comprises of from 0.1 to 1.0% by weight of the total composition of an additive consisting of a blend of alkoxylated nonionic compounds, nonionic fatty compounds, and hydrophobic silica.

14. A pasty fill and finishing material, in particular physically drying sprayable fill and finishing material, prepared from the composition according to claim 1.

15. A method for producing a pasty fill and finishing material according to claim 14, wherein the method is based on a two-stage process, according to which in a first step dry components are homogenized, and in a second step, the homogenized dry components are added to aqueous or water-dilutable components.

16. The composition for a pasty fill and finishing material according to claim 1, wherein the at least one filler has a density dependent flowability ($ff_\rho$) value of from 6 to 8.

17. The composition for a pasty fill and finishing material according to claim 1, wherein the at least one filler has a density dependent flowability ($ff_\rho$) value of from 5 to 10.

18. The composition for a pasty fill and finishing material according to claim 1, wherein the first carbonate has a D98 value of from 80 to 100 µm and the second carbonate has a D98 value of from 150 to 170 µm and wherein the first and/or the second carbonate has/have a D50 value of from 15 to 25 µm.

19. The composition according to claim 1, wherein the composition further comprises from 0.1 to 0.4% by weight of the total composition of an additive consisting of a blend of alkoxylated nonionic compounds, nonionic fatty compounds, and hydrophobic silica.

20. The composition according to claim 1, wherein the first carbonate comprises calcium magnesium carbonate and the second carbonate comprises calcium carbonate.

* * * * *